(12) United States Patent
Winkelman et al.

(10) Patent No.: US 6,488,144 B2
(45) Date of Patent: Dec. 3, 2002

(54) PRE-INSERTED RIVET BELT FASTENER AND APPARATUS AND METHOD FOR APPLICATION THEREOF

(75) Inventors: John H. Winkelman; Joseph C. Vogrig, both of Naperville; Gary E. Mitas, Downers Grove, all of IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 10/010,666

(22) Filed: Dec. 6, 2001

(65) Prior Publication Data

US 2002/0040841 A1 Apr. 11, 2002

Related U.S. Application Data

(60) Division of application No. 09/436,840, filed on Nov. 9, 1999, now Pat. No. 6,374,999, which is a continuation-in-part of application No. 09/177,238, filed on Oct. 22, 1998, now Pat. No. 6,216,851.

(51) Int. Cl.$^7$ .......................... B65G 17/00; F16G 3/00; F16B 21/00
(52) U.S. Cl. .................. 198/844.2; 227/58; 227/59; 227/60; 227/61; 29/432.1; 474/253; 474/255; 474/257
(58) Field of Search ................. 198/844.2; 227/58–62; 24/336; 29/432.1, 525.06, 525.07; 474/253, 255, 257

(56) References Cited

U.S. PATENT DOCUMENTS

| | | | | |
|---|---|---|---|---|
| 3,670,943 A | * | 6/1972 | Berger | 227/60 |
| 4,365,411 A | * | 12/1982 | Muldoon, Jr. | 227/144 |
| 4,688,711 A | * | 8/1987 | Gladding et al. | 227/147 |
| 4,815,587 A | * | 3/1989 | Musil | 198/728 |
| 5,368,214 A | * | 11/1994 | Schick | 227/147 |
| 5,524,808 A | * | 6/1996 | Vogrig | 227/147 |
| 5,531,012 A | * | 7/1996 | Schick | 227/147 |
| 5,544,801 A | * | 8/1996 | Schick | 227/110 |
| 5,553,359 A | * | 9/1996 | Herold | 24/33 P |
| 6,216,851 B1 | * | 4/2001 | Mitas et al. | 198/844.2 |
| 6,374,999 B1 | * | 4/2002 | Winkelman et al. | 198/844.2 |

FOREIGN PATENT DOCUMENTS

| GB | 9410 | * | 4/1919 |
|---|---|---|---|
| GB | 612565 | * | 11/1948 |

* cited by examiner

Primary Examiner—Christopher P. Ellis
Assistant Examiner—Mark A. Deuble
(74) Attorney, Agent, or Firm—Fitch, Even, Tabin & Flannery

(57) ABSTRACT

A fastener for splicing ends of conveyor belts together is provided having a rivet that is pre-inserted thereto to provide speed and ease in installation. The rivet is held in an aperture of the upper plate by an interference fit at the lower end thereof. Preferably, the interference fit is achieved by knurling of the lower end portion of the rivet shaft to create raised interference portions or ridges integral therewith that are sized to be in an interference fit in the upper plate aperture. The remainder of the shaft can be sized to provide clearance between it and the aperture. An applicator machine tool is also provided for automatically securing a strip of the pre-inserted rivet fasteners to a belt end in a fast and efficient manner. The tool uses operating members to first drive pilot nails through the belt lower surface into registry with the rivets, and thereafter the rivets are driven coordinated with the pilot nails that are withdrawn back through the belt. The pilot nails stop at a predetermined position and the rivets continue to be driven for forming the upset heads at the bottom of the rivet.

11 Claims, 11 Drawing Sheets

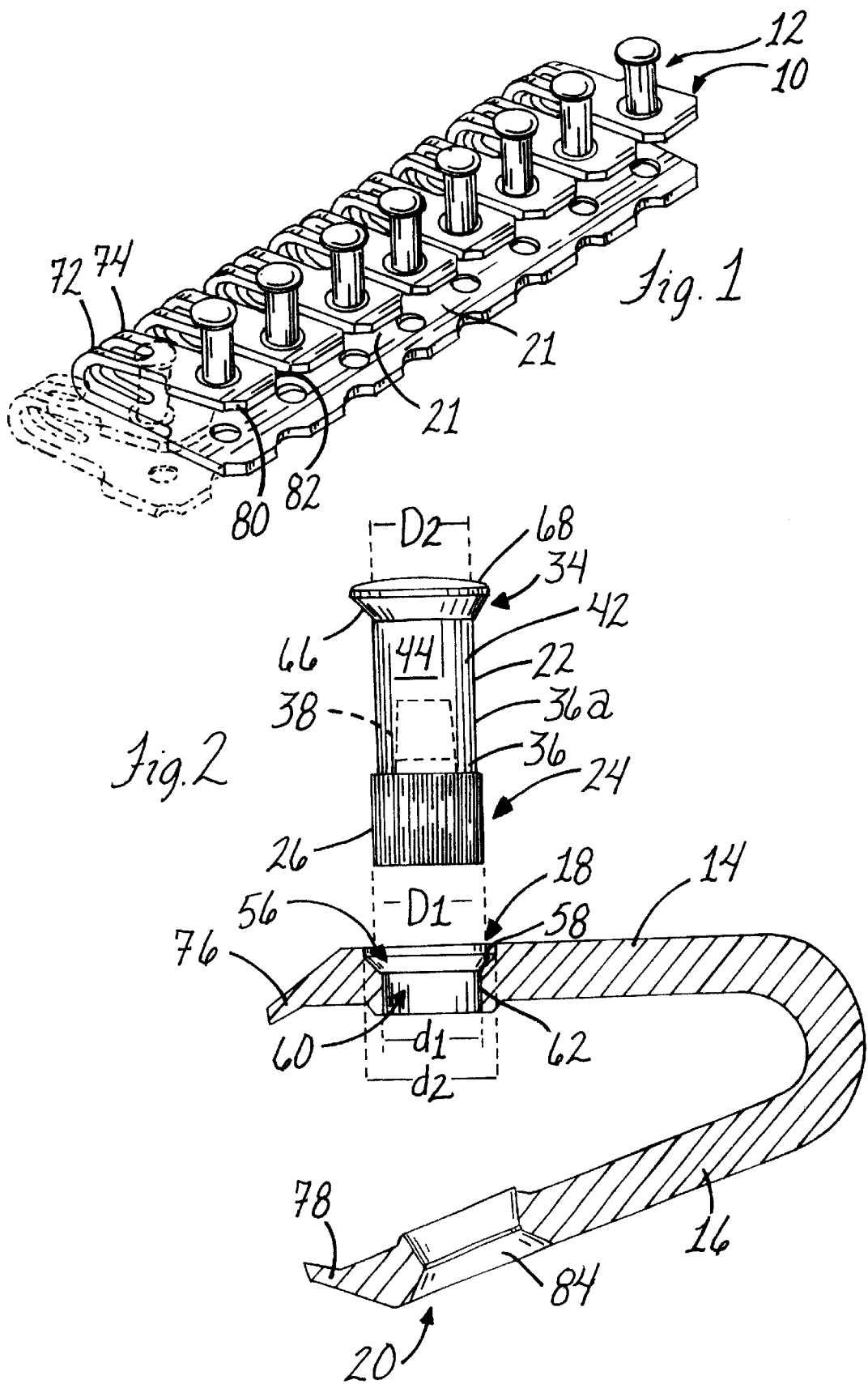

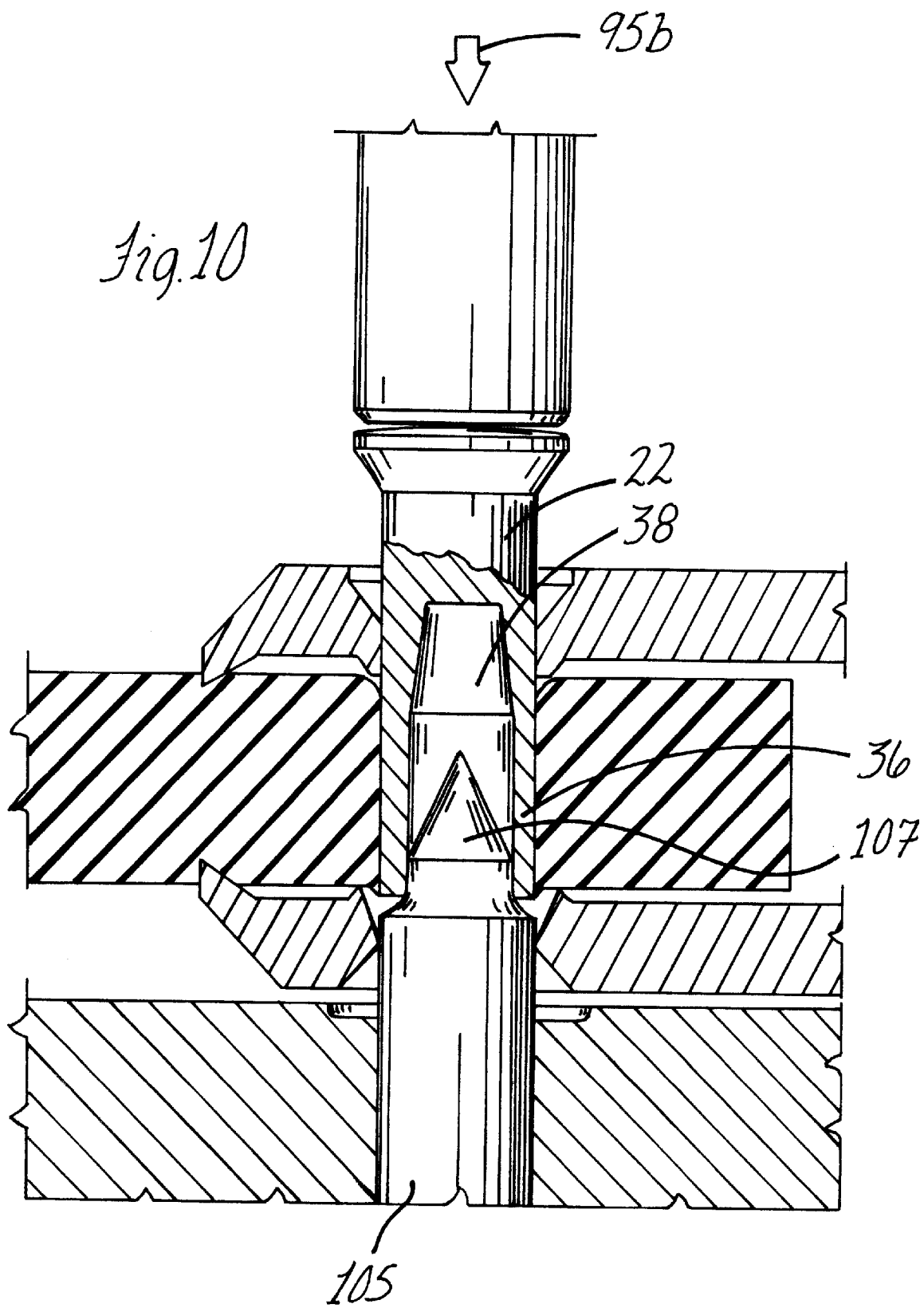

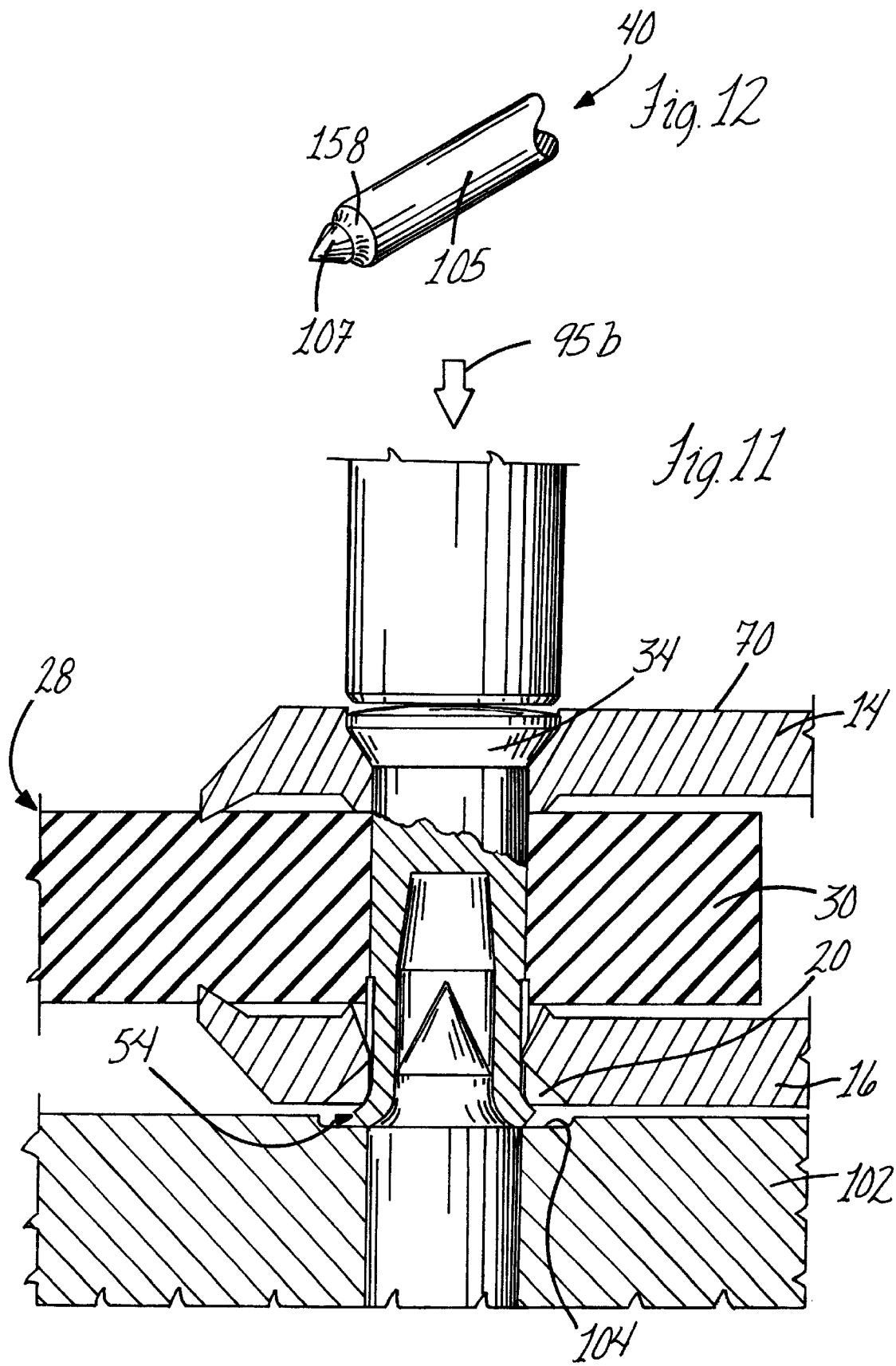

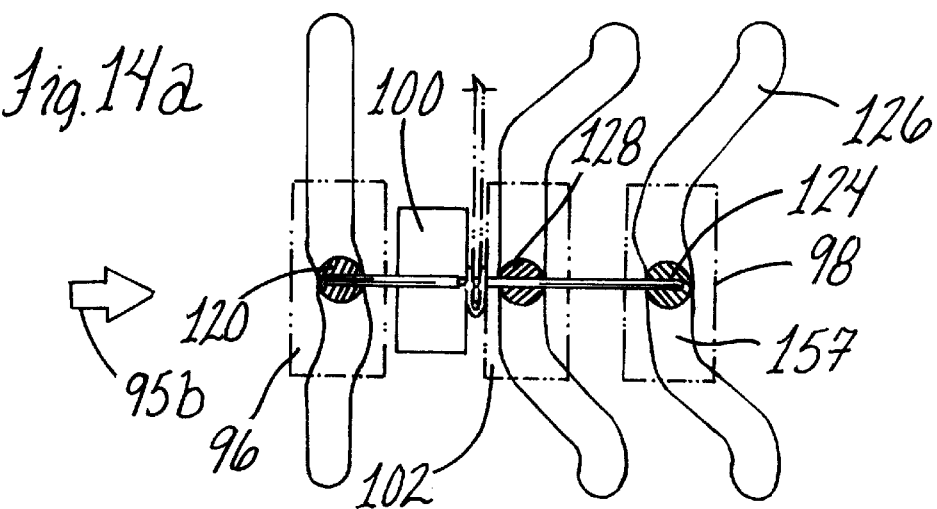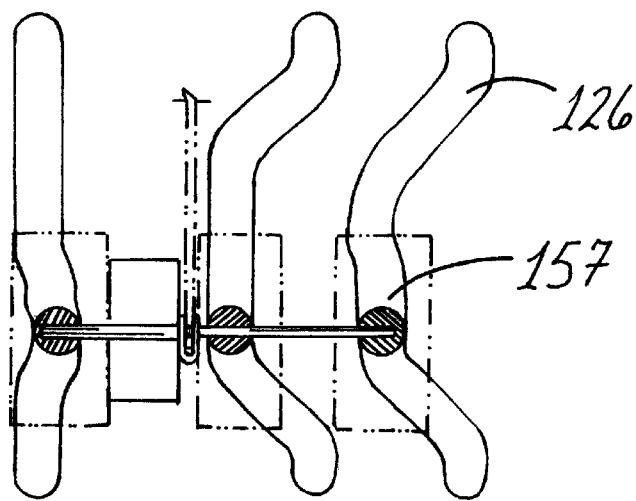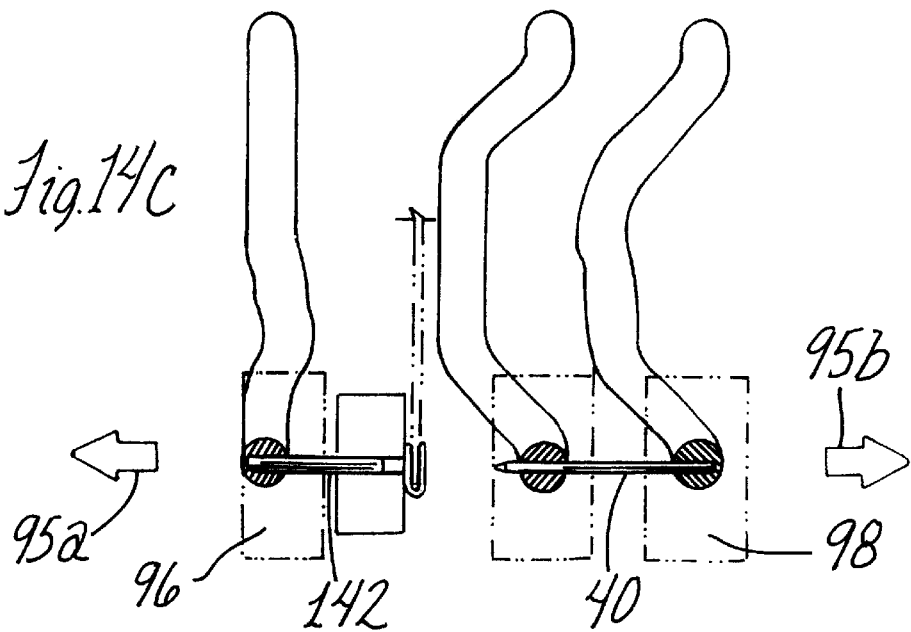

PRE-INSERTED RIVET BELT FASTENER AND APPARATUS AND METHOD FOR APPLICATION THEREOF

CROSS REFERENCE TO RELATED APPLICATION

This is a division, of prior application Ser. No. 09/436,840, filed Nov. 9, 1999, now U.S. Pat. No. 6,374,994, which is herby incorporated herein by reference in its entirety. The entire disclosure of the prior application, from which a copy of the oath or declaration is supplied under paragraph 3 below, is considered as being part of the disclosure of the accompanying application, and is hereby incorporated by reference therein.

This application is a Continuation-In-Part of patent application entitled RIVET BELT FASTENER, Ser. No. 09/177,238, filed Oct. 22, 1998, now U.S. Pat. No. 6,216,851.

FIELD OF THE INVENTION

The invention relates to fasteners for splicing ends of conveyor belts together and applicators therefor and, more particularly, to conveyor belt fasteners having rivets pre-inserted thereto and an apparatus and method for securing pre-inserted rivet fasteners to belt ends.

BACKGROUND OF THE INVENTION

To join two belt ends together, mechanical belt fasteners are typically used either of the hinged type where the individual fasteners have upper and lower plates joined by arcuate loops for mating with the loops of identical hinged fasteners on other belt ends or the solid plate type where the upper and lower plates span the joint between the two belt ends to be spliced together. In both cases, the plates have apertures therein that are aligned when clamped on respective upper and lower surfaces of the belts so that fastener members, e.g. rivets, staples, can be installed through the apertures and the belt for securing the belt fasteners to the belt ends. Conveyor belts having these types of splices in place can be used in a wide variety of applications depending on the materials being conveyed and the stresses applied to the splice during conveyor belt operations.

To assist in installation of rivets to belt fasteners with the rivets extending through the carcass of the conveyor belt, pilot nails have been utilized attached to a lower, hollow end portion of the rivet, such as shown in U.S. Pat. No. 3,913,180, commonly assigned to the assignee of the present invention. The pilot nails fit through an aperture in the upper plate and pierce the underlying upper surface of the belt and lead the attached rivets through the belt until the lower, hollow end of the rivet projects through the lower plate aperture for being upset thereat to form a flared rivet head at the bottom of the rivet shaft. After the bottom rivet head is formed, the nail is released from being held in the hollow end of the rivet and is caught in the applicator tool. This creates the problem of what to do with the mess created by the separated pilot nails as well as complicating the application process.

There have been various application tools developed for installing riveted belt fasteners to belt ends. Applicants' assignee herein has tools for users that allow individual rivet and pilot nails assemblies to be driven as well as those that can gang drive several of these assemblies simultaneously such as for larger rivet fasteners that utilize several rivets for an individual fastener. The present invention is not limited to the number of rivets used with a fastener. An applicator tool for rivet fasteners is shown in applicants assignee's co-pending U.S. patent application, Ser. No. 09/177,238, whose disclosure is incorporated as if reproduced in its entirety herein. In each instance, the rivets and nails have to be loaded into a shaft of the tool aligned over the apertures of the plates for driving therethrough. This can create undesirable delays in the installation process for splicing belt ends using rivet belt fasteners.

For splice strength using riveted fasteners, it is very important that the heads of the rivet are properly formed. Further, in applications where the conveyor belts are used for agricultural equipment such as round hay balers and net wrapping hay balers, it is very important to maintain a low profile for the fastener secured on the belt end. To this end, the rivet heads should be seated in the recessed apertures of the plates so they do not project over the top thereof as otherwise the projecting portions of the head may catch or snag on the net wrapping about the bales. These agricultural applications also tend to be very abusive on the splice in terms of the high-tension forces they are exposed to and the relatively small diameter pulleys, e.g. 3 to 3.5 inches in diameter, about which they must travel. To make the fasteners stronger, larger, thicker plates can be utilized along with greater numbers of rivets. However, this raises the costs for the fastener and is a detriment to their ability to travel about small sized pulleys. Thus, one option is to reduce the size of the plate by keeping it relatively thick and lowering the number of rivets used therewith. In this instance, proper forming of rivet heads becomes extremely important as there are fewer rivets holding the plates onto the belt ends.

Accordingly, there is a need for a rivet fastener that can be installed to belt ends with greater ease and speed, and an application tool for this purpose. Further, a rivet fastener that is relatively small in size but provides relatively high strength is needed.

SUMMARY OF THE INVENTION

In accordance with the present invention, a fastener for splicing ends of conveyor belts together is provided having a rivet that is pre-inserted to provide speed and ease in installation. Although one rivet per fastener is illustrated and described, one or more rivets can be pre-inserted on an individual fastener in accordance with the teachings of the invention herein. In the context of the present invention, the term "pre-inserted" refers to the rivet being held in the plate aperture so that the rivet is carried by the plate before the installation process commences. The pre-inserted rivet preferably is held by an interference fit in the plate aperture as described hereinafter, although the rivet could be held by other mechanisms such as by an adhesive between the rivet and aperture.

As mentioned above, the rivet can be held in an aperture of the upper plate by an interference fit at the lower end thereof. Preferably, the interference fit is achieved by knurling of the lower end portion of the rivet shaft to create raised interference portions or ridges integral therewith that are sized to be in an interference fit in the upper plate aperture. The remainder of the shaft can be sized to provide clearance between it and the aperture. In this manner, during driving of the rivet, after the interference portions clear the upper plate aperture, the rivet is no longer in press-fitting engagement therewith. This avoids scraping of the rivet shaft by the edges about the upper plate aperture minimizing damage to the rivet body and so that the softer metal material of the rivet is not pushed up under the head preformed at the upper end thereof as might otherwise prevent the upper rivet head from seating fully in the recessed aperture of the upper plate. Further, with the upper rivet head properly seated in the upper plate recessed aperture, the amount of material at the lower end of the rivet for being upset is sufficient for proper forming of the lower rivet head to increase the holding strength of the rivet. In a preferred form where only a single rivet is used to secure the fastener to the belt, the ability to properly form and seat the rivet heads for providing good holding power is of particular importance.

Accordingly, and in one form of the invention, a fastener for splicing ends of conveyor belts together is provided including upper and lower plates for being clamped on respective upper and lower surfaces of the conveyor belt. Apertures of the plates are generally aligned with each other with the plates clamped on the belt. A rivet is provided having a shaft with an end portion thereof held in an upright, pre-inserted position in the aperture of the upper plate prior to riveting of the fastener to the belt end. Interference portions integral with the shaft end portion are sized to be in an interference fit in the upper plate aperture. Thus, the present fastener avoids the need for loading rivets into a shaft of an applicator tool speeding installation time.

The interference portions can include raised ridges having an interference diameter larger than the aperture diameter. Preferably, the rivet shaft has a clearance diameter and includes a preformed enlarged head at one end thereof. The interference diameter of the raised ridges is larger than the clearance diameter so that after the held rivet portion is driven through the upper plate aperture, the shaft clears the aperture to minimize scraping and pushing of material of the rivet along the shaft thereof up under the preformed rivet head. Where the upper plate includes a recess about the aperture, the preformed enlarged rivet head is fully seated to provide a low profile riveted fastener. This is desirable in terms of avoiding problems with materials or items conveyed on the belt, e.g. net wrap hay bales. In addition, the seating of the rivet head in the recessed aperture allows an upset head at the bottom of the rivet shaft to be properly formed thereat.

In one form, the rivet portion includes a tubular wall portion and a hollow bore to receive a pilot therein to lead the rivet through the belt. The hollow tubular portion is adapted to be flared to form an upset head in the lower plate aperture.

In a preferred form, the rivet is a single rivet used with the plates for clamping to the belt and there is at least one arcuate hinged loop joining the upper and lower plates with the loop and plates having a predetermined substantially constant material thickness in cross-section and a predetermined width. The ratio of the predetermined thickness to width is sized to provide small, heavy-duty hinged fastener riveted to a belt by the single rivet.

In another form of the invention, a rivet hinged belt fastener for splicing of belt ends together is provided including a pre-inserted rivet including a shaft thereof held in the aperture of the upper plate and an enlarged preformed head at one end of the shaft above the upper plate. A tubular portion of the shaft is adapted to be flared into a rivet head and held in the upper aperture to provide a pre-inserted hollow rivet on the upper plate. Preferably, the tubular portion of the rivet shaft is sized to be held by an interference fit in the upper plate aperture.

In one form, the rivet shaft includes a solid portion below the head sized to clear the upper plate aperture during driving of the rivet therethrough to allow the rivet preformed head to seat substantially flush in the upper plate recessed aperture. As stated, the present pre-inserted rivet fastener provides a low profile so that the upper head does not catch on wrapping of hay bales when used in agricultural applications, and an upset head can be properly formed at the lower end of the rivet for seating in the recessed aperture of the lower plate.

In a preferred form, the shaft tubular portion is knurled to form integral outwardly projecting larger diameter portions tightly gripped in the aperture of the upper plate. In this manner, the shaft of the rivet can be provided with the larger diameter portions in a secondary operation after forming of the rivet body without removal of material therefrom.

In another aspect of the invention, an apparatus for installing fasteners having a pair of plates with apertures therein on ends of conveyor belts is provided. The apparatus includes a frame, and a plurality of operating members mounted to the frame. A positioning member is provided between the operating members for placing the fasteners and belt in predetermined positions relative to each other with the belt end projecting between the fastener plates. A camming mechanism shifts the operating members in a transverse direction relative to the belt. Rivets of the fasteners are driven by first one of the operating members on one side of the belt for clamping the fastener to the belt end. Pilot nails are aligned with the rivets driven by a second one of the operating members on an opposite side of the belt to pierce the belt. An actuator cooperates with the camming mechanism to coordinate the shifting of the operating members for driving the rivets and nails so that the nails are first driven through the belt to the aligned rivets and the rivets together with the nails are then driven back through the belt with the rivets being led by the pilot nails therethrough. The present apparatus is especially well adapted for use by original equipment manufacturers (OEMs) that have to install large volumes of belt splices on a regular basis.

In one form, the rivets include a tubular end portion pre-inserted into the aperture of one of the plates of the fastener, and the nails are driven through the aperture of the other plate and the belt into registry with the rivet tubular end portion. Because the nails are not separably attached to the rivets as in the previously-described rivet and nail assemblies, the nails can be designed for reuse thereby eliminating the problem of having to deal with the nails as scrap and the time and costs associated therewith.

Preferably, the actuator is a power actuator that has a predetermined driving stroke in a longitudinal direction that is larger than the distance the actuator causes operating members to shift to provide a mechanical advantage in driving of the rivets and nails.

In one form, the camming mechanism includes cam followers of the operating members that are substantially fixed against shifting in the longitudinal direction, and cam tracks in which the followers are disposed for shifting the operating members in the transverse direction as the tracks are shifted in the longitudinal direction by the actuator. In this manner, the camming mechanism converts the longitudinal motion of the cam tracks vis-a-vis the actuator into transverse motion of the operating members and the rivets and nails driven thereby.

In a preferred form, the camming mechanism includes a rack having the cam tracks and the actuator is a single power cylinder which shifts the rack and cam tracks in the longitudinal direction to shift the operating members in the transverse direction by a single driving stroke of the cylinder. Accordingly, the entire riveting operation from piercing the belt with the pilot nails to driving of the rivet and nails occurs by way of one driving stroke of the power cylinder.

In one form, one of the operating members includes an anvil surface and the pilot nail includes a rivet curling surface. The camming mechanism is operable to shift the second operating member to bring the rivet curling surface into cooperation with the anvil surface. The second operating member then pauses while the first operating member continues to shift to push the rivet against the curling surface and to the anvil surface for forming an upset head on the rivet. As is apparent, the camming mechanism provides highly coordinated shifting of the various operating members to properly form rivets for securing fasteners to belt ends.

Preferably, the third operating member is a clamping and anvil member shifted by the camming mechanism to clamp the fastener plates on surfaces of the belt at the end thereof. An adjustment screw is operable to shift the second and third operating members together relative to the frame to allow for different thicknesses of belts to be riveted.

In yet another aspect of the invention, a method of securing a belt fastener having a pre-inserted rivet thereon to a belt end is provided. The method includes placing a belt end including upper and lower surfaces between upper and lower plates of a plurality of fasteners with the pre-inserted rivets on one of the upper and lower plates, causing pilots to be driven through apertures of the other of the upper and lower plates and through the adjacent belt surface and then into hollow bores in tubular rivet ends of the pre-inserted rivets, driving the pre-inserted rivets through the apertures of the one plates with the hollow rivets following the previous path of the pilots, and forming the tubular ends of the rivets into flared-shaped rivet heads at the other plates to secure the belt fasteners to the belt end.

The pilots can be nails including sharp leading points thereof and the method can further include spreading material of the belt by driving of the pilot nails therethrough from the belt lower surface to the belt upper surface and into the rivet bores to minimize belt material punched out by the rivets as they are driven and led back through the belt by the pilot nails. In this manner, a good, strong splice is formed as damage to the carcass of the belt is minimized which would otherwise occur if the rivet was tearing into the belt carcass as it was being driven therethrough. After the fastener is riveted to the belt end, the belt material tightly grips about the shaft of the rivet with little or no loose play therebetween. Further, because the belt material is spread, there is no punching of belt material or slugs therefrom, and thus there are no pieces of belt that have to be cleaned from around the tool.

BRIEF DESCRIPTION OF THE DRAWINGS

FIG. 1 is a plan view of a strip of fasteners in accordance with the present invention showing a rivet pre-inserted to an upper plate of each of the fasteners;

FIG. 2 is a cross-sectional view of one of the fasteners showing raised interference portions at a lower end portion of the rivet for being held in an interference fit in an aperture of the fastener upper plate;

FIG. 10 is a view similar to FIG. 9 showing the rivet punch driving the rivet together with the pilot nail back through the belt carcass;

FIG. 11 is a view similar to FIG. 10 showing the pilot nail stopping so that a curling shoulder surface thereon is in alignment with an anvil surface with the punch continuing the downward driving of the rivet for flaring an upset head on the bottom of the rivet shaft;

FIG. 12 is an enlarged fragmentary perspective view of a pilot nail showing a pointed end and the curling shoulder surface adjacent thereto;

FIGS. 14a–c are views similar to FIGS. 13a–c showing continued progression of the cam followers in their respective tracks to drive the rivet and pilot nail back through the belt, form an upset head at the bottom of the rivet, and release the pilot nail from engagement with the rivet.

DETAILED DESCRIPTION OF THE PREFERRED EMBODIMENT

Figure 3:
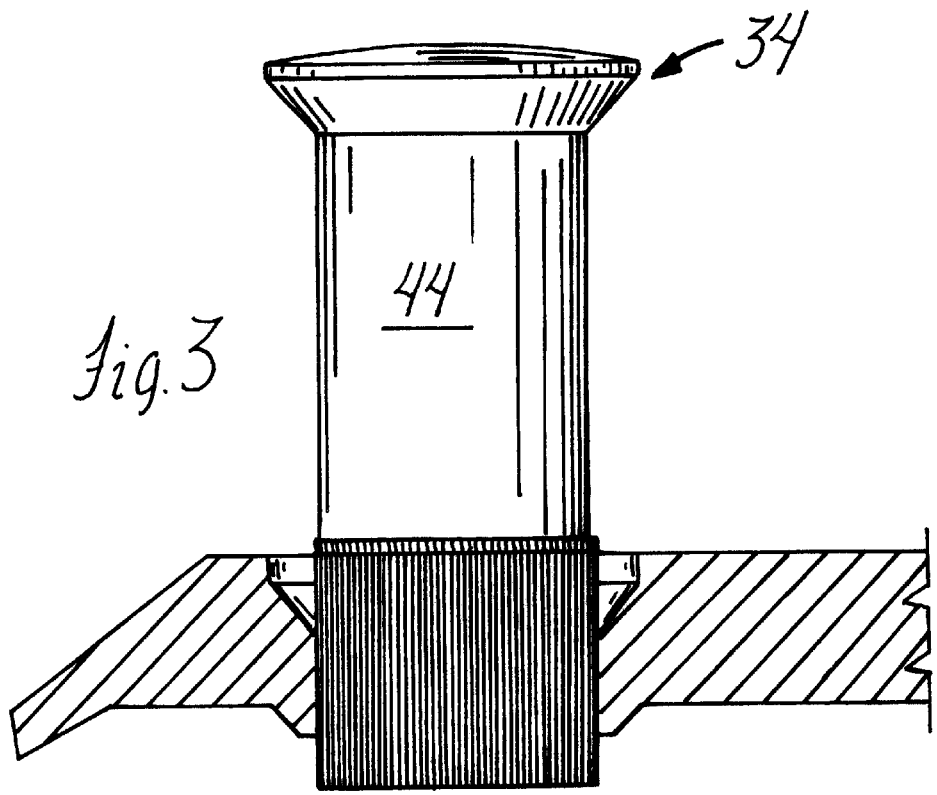
FIG. 3 is an enlarged view showing the rivet press fit in the upper plate aperture.

In FIG. 1, a strip of fasteners 10 including rivets 12 pre-inserted thereto is shown. The individual fasteners 10 in the strip include an upper plate 14 and a lower plate 16 each including an aperture 18 and 20, respectively, formed therein, as best seen in FIG. 2. The fasteners 10 are attached in the strip by bridge portions 21 between adjacent lower plates 16. The rivet 12 includes a shaft 22 that includes a lower end portion 24 which has interference portions 26 formed thereon. The interference portions 26 are sized to be in an interference fit in the upper plate aperture 18 so that the rivets 12 are held in an upright, pre-inserted position relative to the upper plate 14, as can be seen in FIG. 1.

Pre-inserting of the rivets 12 in this manner to the upper plates 14 of the fasteners 10 is advantageous in terms of the ease and speed of their application to conveyor belts 28 at the end portions 30 thereof. A person applying these fasteners 10 no longer has to deal with a separate bag or box of rivets or assemblies of rivets and pilots and making sure they have a sufficient number for the number of fasteners 10 they have to apply to a belt end 30. Further, no longer does a user have to individually load each rivet into a shaft of an applicator tool which can be very cumbersome especially when large number of splices have to be formed. Alternatively, where a special applicator tool is not utilized, the user does not have to position the rivet and pilot nails over the upper plate aperture and hold it while they hammer these through the belt The pre-inserting of the rivets eliminates the separate step of taking rivets or rivet and nail assemblies from their package and inserting them into a tool shaft or manually aligning them in the upper plate aperture (s), thus easing and speeding the installation. As will be more fully discussed hereinafter, the pre-inserted rivet fasteners 10 herein are particularly well suited for use with an automated applicator tool 32 for use by OEMs for the problems of loading rivets 12 into tool shafts or having to individually hammer the rivets is not present.

More particularly, the integral interference portions 26 at the lower end portion 24 of the rivet shaft 22 are raised from the remainder of the shaft 22 so as to be provided with diameter, $D_1$, that is larger than the diameter, $d_1$, of the aperture 18, as best seen in FIG. 2. In the illustrated and preferred form, the rivet 12 is hollowed out at the lower end portion 24 in a manner similar to that of the rivets utilized with the previously-described rivet and pilot nail assemblies with the rivet 12 including a preformed, enlarged head 34 at the upper end of the shaft 22. In this regard, the shaft 22 has a tubular wall portion 36 including the lower end portion 24 and defining a hollow bore 38. The hollow bore 38 cooperates with a pilot 40 (FIG. 12) that leads the rivet 12 through the belt 28 in a manner as will be more fully described hereinafter in connection with the applicator tool 32. Above the tubular wall portion 36 and below the upper preformed head 34 is a solid portion 42 of the shaft 22. As shown, the tubular wall portion 36 extends for over half of the length of the rivet shaft 22. Thus, the diameter, $D_1$, of the raised interference portions 26 is larger than diameter, $D_2$, of cylindrical surface 44 which spans section 36a of the tubular wall portion 26 above the interference portions 36 and the solid portion 42 of the shaft.

Figure 4:
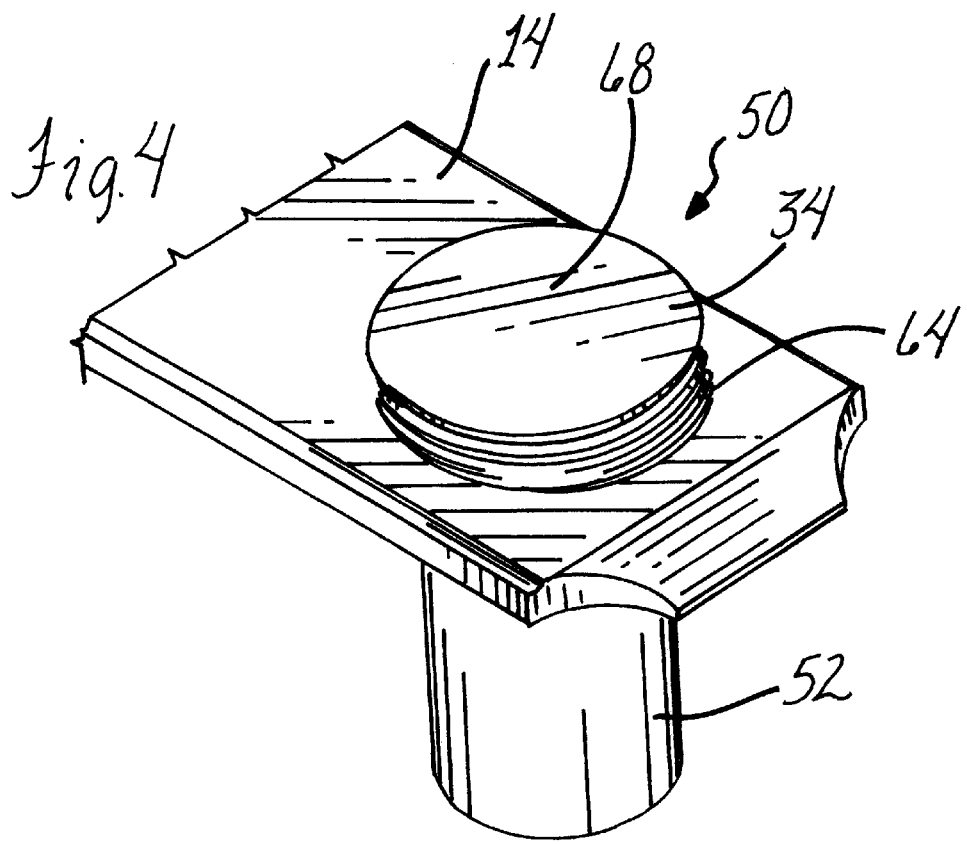
FIG. 4 is a plan view of a rivet having a shaft sized to be in an interference fit in the upper plate aperture and lacking the raised interference portions with scrapped material from the shaft lodged under a preformed upper head of the rivet.

To form the raised interference portions 36, the lower end portion 24 of the shaft 22 can be knurled so that material on the lower end portion 24 of the rivet shaft 22 is raised to form ridges 46 spaced circumferentially about the shaft lower end portion 24 and extending longitudinally or vertically thereon with valleys 48 formed therebetween. The diameter,$D_1$, across the peaks of the ridges 46 is greater than the diameter, $D_2$, of the shaft surface 44 while the diameter of the valleys 48 maybe slightly less than the diameter, $D_2$, of the surface 44. The volume of the material of the lower end portion 24 of the shaft 22 preferably remains unchanged upon formation of the ridges 46 over a rivet 50 having a smooth walled shaft 52, such as shown in FIG. 4. In this manner, the rivet 12 herein has the same amount of material at the lower end portion 24 thereof as the rivet 50 for forming the lower upset head 54, as shown in the process of being formed in FIG. 11. It is important to maximize the shaft material at the lower end portion 24 for proper forming of the upset head 54 as with the hollow rivet 12 herein the lower upset head 54 is generally the weakest area of the formed rivet 12. By keeping the same volume of shaft material at the rivet lower end portion 24, there will be no loss in holding power attributable to the provision of the raised interference portions 26 at the shaft lower end portion 24.

The diameter, $D_1$, across the ridges 46 at the shaft lower end portion 24 is larger than the diameter, $d_1$, of the upper plate aperture 18 so that with the rivet 12 pressed into the aperture 18, it will be held tightly in an upright, pre-inserted position therein, as shown in FIGS. 1 and 3. More specifically, with the rivet 12 having an enlarged upper head 34, the aperture 18 is preferably recessed including an upper portion 56 having an inclined conical surface 58. A lower portion 60 of the aperture 18 includes a straight cylindrical surface 62. The conical surface 58 tapers down from its maximum diameter, $d_2$, to the cylindrical surface 62 which is provided with the diameter, $d_1$, sized to be smaller than the diameter,$D_1$, of the shaft interference portions 26, and larger than the diameter, $D_2$, of the shaft surface 44, for reasons discussed hereinafter.

The relatively small size of the rivets and recessed apertures 18 was found to make it very difficult to maintain tolerances such as between the smooth shaft 52 of rivet 50 where it was sized to be in an interference fit in the recessed aperture 18. For instance, and by way of example and not limitation, the shaft 22 can have a length from the bottom of the head 34 to the end of the lower portion 24 of approximately 0.413 inch with diameter, $D_2$, of the shaft surface 44 being approximately 0.1855 inch. The tolerances for such a small sized rivet to be provided with an interference fit in the aperture 18 with a smooth shaft 52 would not allow for a viable product to be manufactured due to the precision required on the sizing of the respective diameters. On the other hand, by providing the raised ridges 46 at the lower end portion 24 of the rivet 12 herein, the tolerance level has been eased considerably, i.e. on the order of several thousands of an inch.

Thus, with the preferred rivet 12 having the above dimensions for its shaft 22, the diameter, $D_1$, across the peaks of the ridges 46 can be approximately 0.191 inch and the diameter, $d_1$, across the aperture cylindrical surface 62 is approximately 0.1865. The tolerance on the ridges 46 is relatively large at 0.003 inch. Similarly, this affords greater tolerance for wear on the size of the punch, i.e. 0.002 inch, that forms the aperture 18 as the aperture 18 can be slightly smaller than specified, i.e. 0.0015 inch, due to the provision of the ridges 46 which can still be folded over in a slightly undersized aperture 18 when inserted therein. Because the diameter of the lower end portion 24 prior to formation of the integral raised interference portions 26 thereon is not critical since it will be knurled for forming the ridges 46, the looser tolerances for obtaining an interference fit between the rivet shaft portion 24 and the aperture surface 62 enable large volume manufacture of the rivets 12 and the apertured fastener plates 14 for holding the rivet 12 in a pre-inserted position thereto.

With the above-described small rivet 12, the interference zone provided at the shaft lower end portion 24 can have a length of 0.155 inch along the shaft 22. Another advantage afforded by providing only a zone of interference fit along the rivet shaft 22 is that the diameter, $D_2$, of the remainder of the shaft 22 across surface 44 can be sized to clear the aperture walls 62, as previously mentioned. In this manner, after the raised portions 26 at the lower end portion 24 of the rivet shaft 22 have cleared the cylindrical 62 during installation of the fastener 10 to belt end portion 30, the shaft 22 will no longer be in press-fitting engagement with the surface 62 reducing the force required for insertion of the rivet 12 through the upper plate aperture 18. Accordingly, the surface 62 of the upper plate 14 about the aperture 18 will not be scraping the material of the rivet shaft 22 as it is being pushed through the aperture 18. Instead, the surface 62 will only serve to guide the shaft surface 44 as it passes therethrough. To this end, the diameter, $D_2$, needs to be sized sufficiently large so that such guiding action can effectively take place rather than have the shaft 22 wobble in the aperture 18 during installation. Because of its clearance diameter, $D_2$, the rivet surface 44 along the rivet shaft 22 will not be damaged during the rivet insertion process. Pre-installing the rivet 12 into the aperture 18 does not tend to generate the above-described scraping action as when the raised ridge 46 are press fit against the aperture surface 62, rather than being pushed up along the shaft 22 they tend to collapse and be folded down there against, as shown in FIG. 3.

It has been found that where an interference fit is provided in the rivet 50 having a smooth wall shaft 52, the scraping of the shaft 52 causes rivet shaft material 64 to be pushed up under the preformed head 34. This scrapped material 64 limits the ability of the preformed rivet head 34 to be properly fully seated in the recessed aperture 18, as shown in FIG. 4. With the rivet head 34 projecting up out of the recessed aperture 18 in this fashion, where the fasteners 10 are used in the previously described hay baler applications, the net wrapping used on the bales of hays can snag on the raised head 34. In this regard, the sizing of the shaft surface 44 with clearance diameter, $D_2$, facilitates proper seating of the preformed head 34 with conical surface 66 on the underside thereof bearing flush against the conical surface 58 in the recessed aperture 18 so that the upper surface 68 of the rivet head 34 does not project above upper surface 70 of the upper plate 14, as can be seen in FIG. 11.

In addition, due to the provision of different diameters, $D_1$ and $D_2$, along the rivet shaft 22, the force level applied to the rivet 12 during the installation thereof can drop-off after the lower end portion 24 including the raised interference portions 26 formed thereon clear the bottom of the cylindrical surface 62 to the level required to continue pushing the rivet 12 through the carcass of the conveyor belt 28. This is in contrast to the smooth walled rivet shaft 52 where, as the rivet 50 is being installed and pushed through the aperture 18 and the belt 28, the pressure required for driving the rivet 50 will progressively increase as the amount of scraped material 64 becomes greater. This scraping problem is exacerbated by the materials typically used for the rivets 12 and the plates 14 and 16 as the rivets are generally of a softer steel material than that of the fastener plates. For example, the fastener plates 14 and 16 can be of a 304 stainless steel material with a Rockwell hardness on the b scale specified at a maximum of 80, and the rivet 12 can be of a softer T430 stainless steel material. Further, because the aperture 18 is a hole that is stamped which generates a tearing of the steel material during hole formation, the cylindrical surface 62 generally will not be a smooth surface and will have some roughness to it increasing the scrapping action along the rivet shaft. Accordingly, the zone of interference fit provided by the lower end portion 24 of the present rivets 12 is desirable so that the rough surface 62 is not engaged against the shaft 22 for its entire length during installation of the rivet 12 to the belt end portion 30.

Static and dynamic testing of the present fastener 10 has shown that it provides holding power no different than applicants' assignee's prior rivet fasteners where the rivet shafts are not in an interference fit with the aperture walls. In comparison to a smooth walled shaft 52 in an interference fit for its entire length in the upper plate aperture 18, the present rivet 12 having interference portions 26 only at the lower end portion 24 thereof is believed to be stronger for several reasons. Because the present rivet 12 avoids creating scrapped material 64 lodged under the preformed head 34 thereof, the bottom of the rivet shaft 22 will have a sufficient amount of material for flaring to properly form the upset head 54 thereat for seating in the lower plate aperture 20. Where the material 64 prevents the rivet head 34 from fully seating in the upper plate aperture 18, there is a corresponding lesser amount of material at the bottom of the shaft 22 for forming the upset head 54. Depending on the amount of scrapped material 64, this can reduce the size of the upset head 54 so that it only loosely seats in the lower plate aperture 20, or in extreme cases prevent an upset head 54 from forming at all. It is also possible that during running of the conveyor belt 20, the scrapped material 64 can break off due to stresses the fastener 10 experiences as the splice travels about pulleys and the fasteners 10 are exposed to scrapers, and the like. Should this occur, the upper head 34 will only seat loosely in the upper plate aperture 18 lowering the holding power of the fastener 10. In addition, the scoring caused by the rough cylindrical surface 62 along the entire length of the shaft 52 can create stress risers which generates areas of high stress concentrations along the rivet 12 and can potentially cause failure thereof.

The illustrated and preferred fasteners 10 herein are designed for use in agricultural applications that involve fairly abusive operating conditions on the belt splices while still requiring that the splices be able to be used with small diameter pulleys, as previously discussed. To this end, the fasteners 10 are provided with plates 14 and 16 that have a small size in terms of their width and length but are relatively thick in comparison thereto.

For the above-discussed agricultural application, the fasteners 10 are preferably hinged fasteners including a pair of arcuate loops 72 and 74 which extend symmetrically from the rear of the plates 14 and 16 for joining them together and which can be mated with the loops of identical fasteners 10 secured to another belt end for receiving a hinge pin (not shown) therethrough to splice the belt ends together. As best seen in FIG. 2, the thickness of the plates 14 and 16 including the hinge loops 72 and 74 is substantially constant, less the outboard ends 76 and 78 of the respective plates 14 and 16 which are coined toward each other to bite into the belt 28 with the fasteners 10 secured thereto. Exemplary sizes for the fastener 10 include a plate width across the outboard ends 76 and 78 including oblique portions 80 and 82 thereof of approximately 0.410 inch and a thickness of the plates 14 and 16 and hinge loops 72 and 74 of approximately 0.089 inch.

Due to the small size of the plates 14 and 16, there is only sufficient area for use of a single rivet 12 therewith. To increase the holding power provided by the rivet 12 utilized in conjunction with the small, thick plates 14 and 16 of the fastener 10 herein, the aperture 18, and particularly the upper recessed portion 56 thereof is maximized in size relative to the width of the plates 14 and 16 so that large rivet heads 34 can be set therein. The diameter, $d_2$, of the aperture portion 56 is preferably at least half the width of the upper plate 14. The aperture 20 of the lower plate 16 can also be provided with a recessed conical portion 84 sized similarly to the upper plate aperture portion 56 and into which the lower upset head 54 of the rivet 12 is curled, as will be more fully described hereinafter.

The use of the single rivet 12 with the relatively small, thick fastener 10 emphasizes the need for the large rivet heads 34 and 54 to be properly seated in their respective aperture portions 56 and 84 so that they substantially fill the relatively large apertures 18 and 20 in the respective fastener plates 14 and 16 for achieving maximum holding power of the fasteners 10 on the belt end 30. As previously described, the clearance diameter, $D_2$, provided to shaft surface 44 enables the upper head 34 of the pre-inserted rivet 12 to be seated flush in the aperture 18 which also allows the bottom end of the rivet shaft end portion 24 to be curled for properly forming the lower rivet head 54 for filling lower plate aperture 20. In this manner, a pre-inserted rivet fastener 10 is provided with high holding power, e.g. PIW (pounds per inch of belt width) rating of 300, at a relatively small size so as to be suitable for the primary application for which they are designed, i.e. agricultural conveying systems such as for hay baling.

Figure 6:
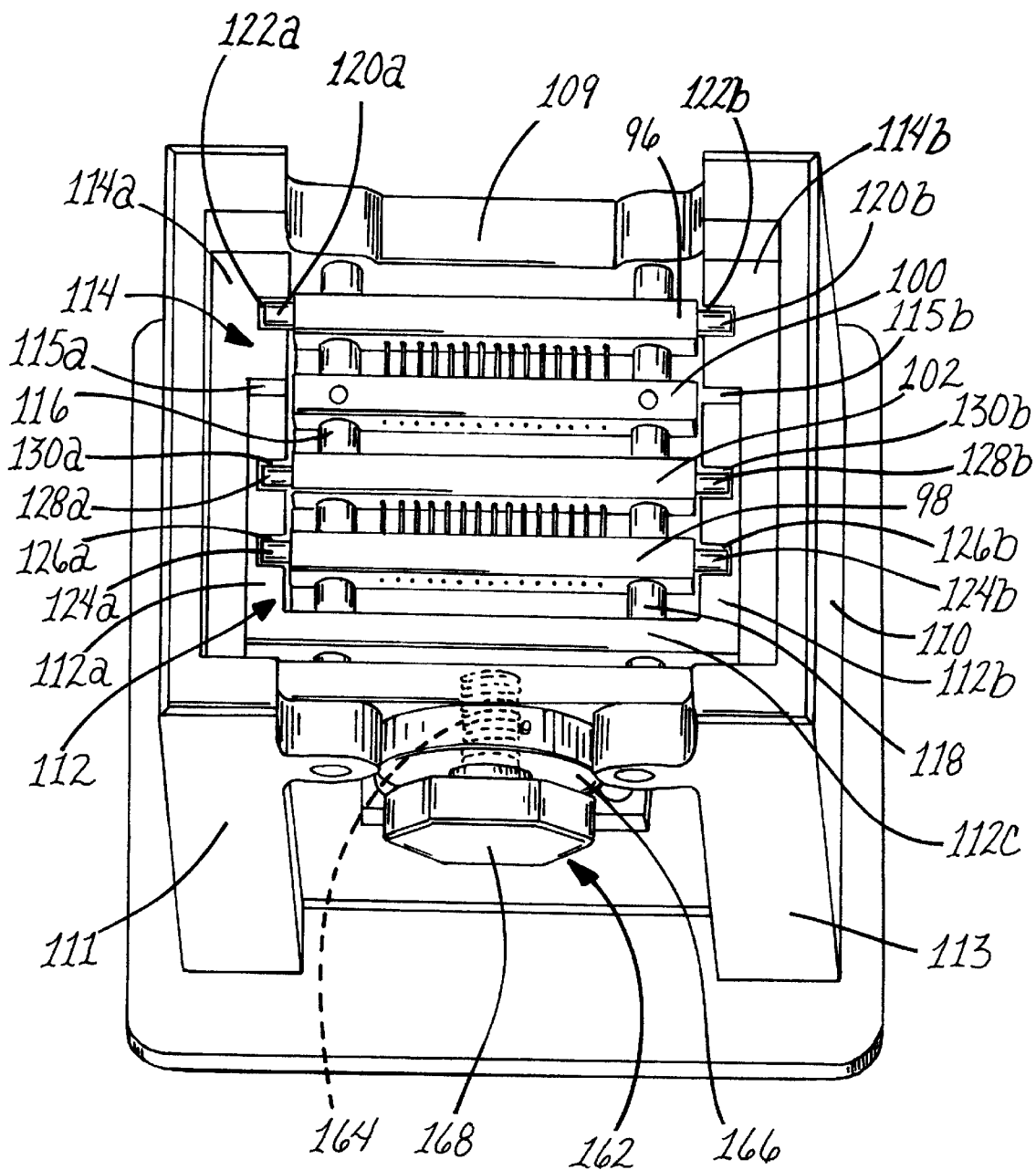
FIG. 6 is a top plan view of the tool of FIG. 5 showing cam followers of the operating members in cam tracks of a camming mechanism of the tool.
Figure 7:
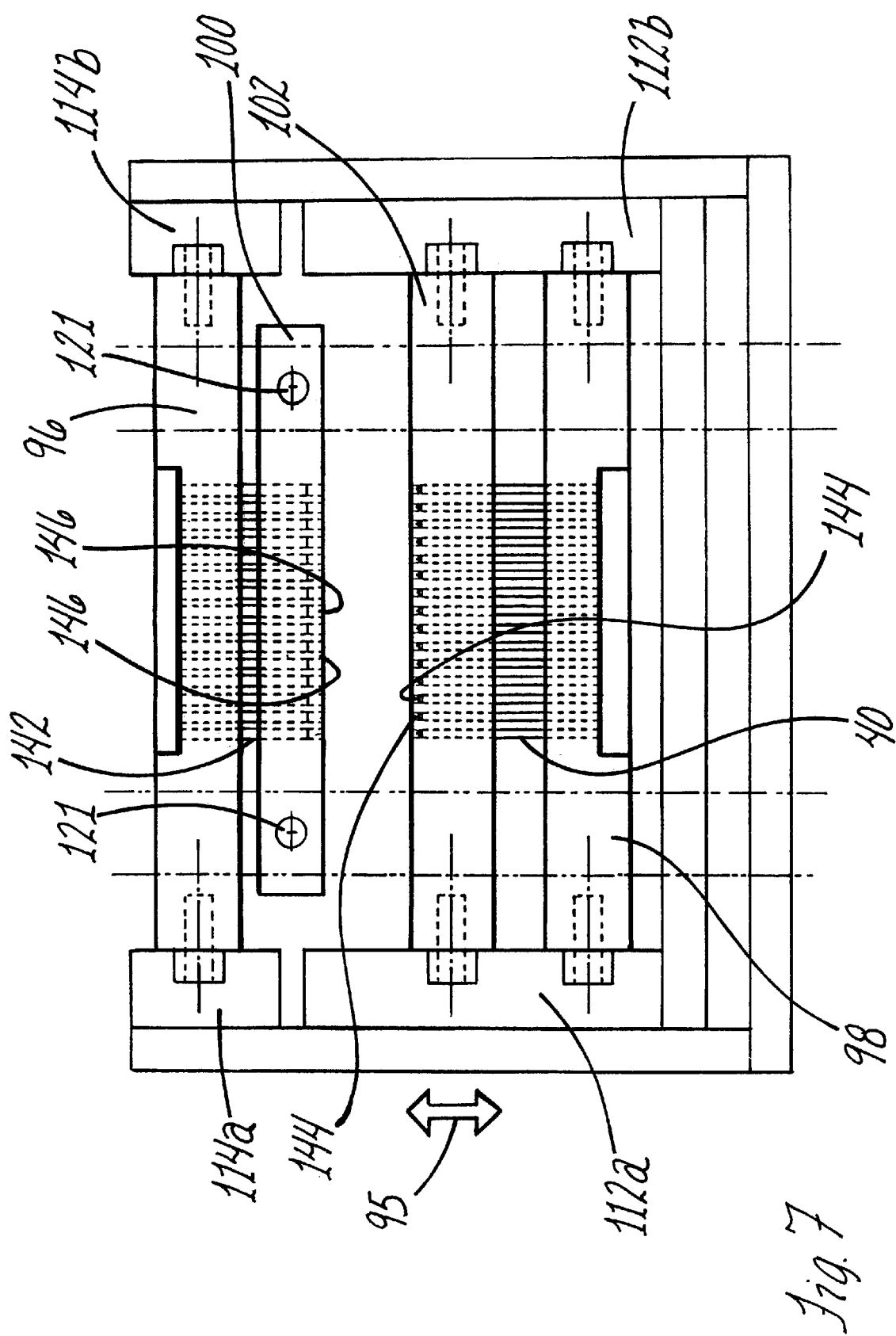
FIG. 7 is an enlarged plan view showing the operating members and rivet punches and pilot nails mounted thereto.
Figure 8:
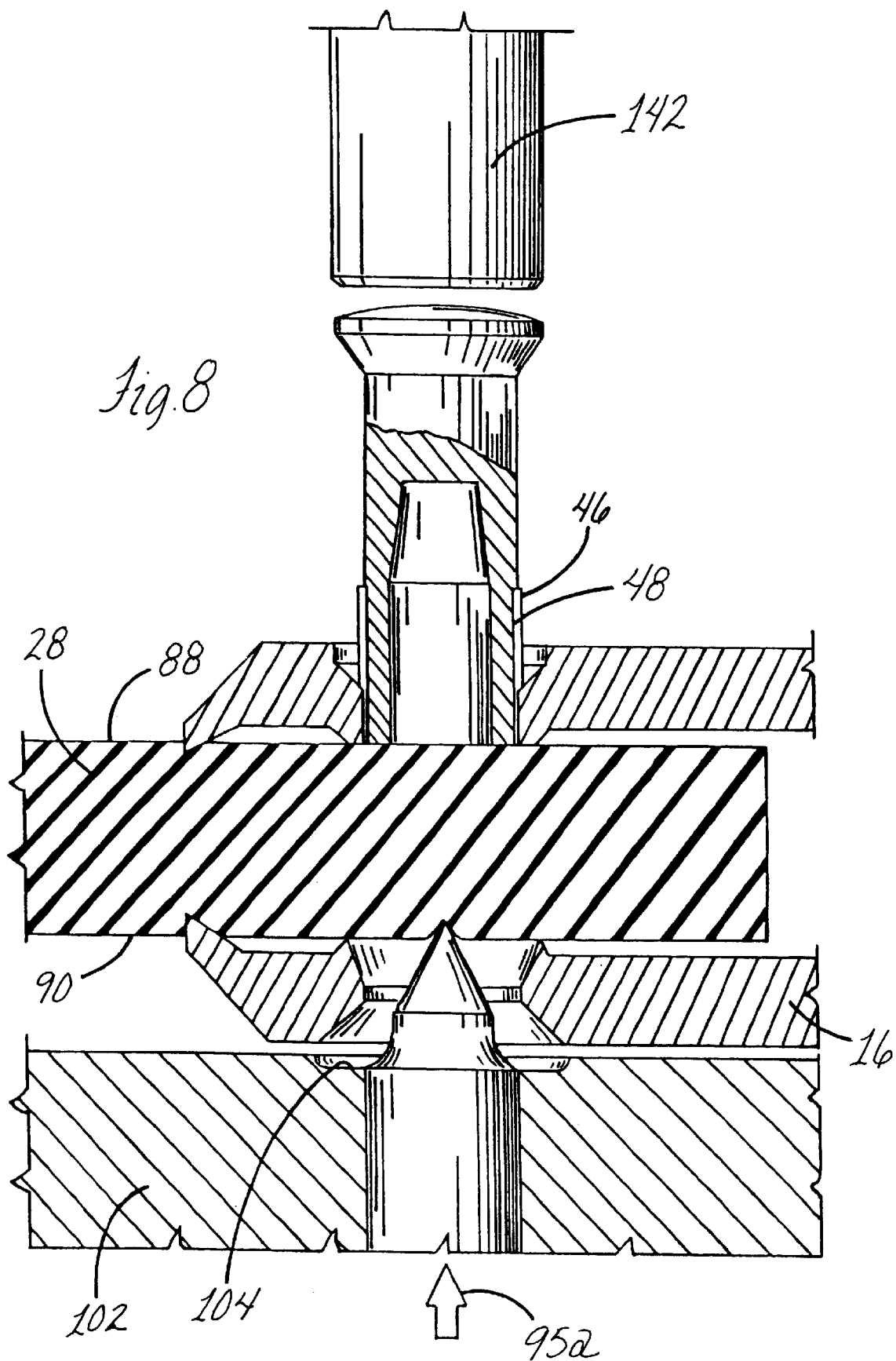
FIG. 8 is an enlarged cross-sectional view showing a rivet and nail aligned on opposite sides of an end portion of the belt in the applicator tool.
Figure 9:
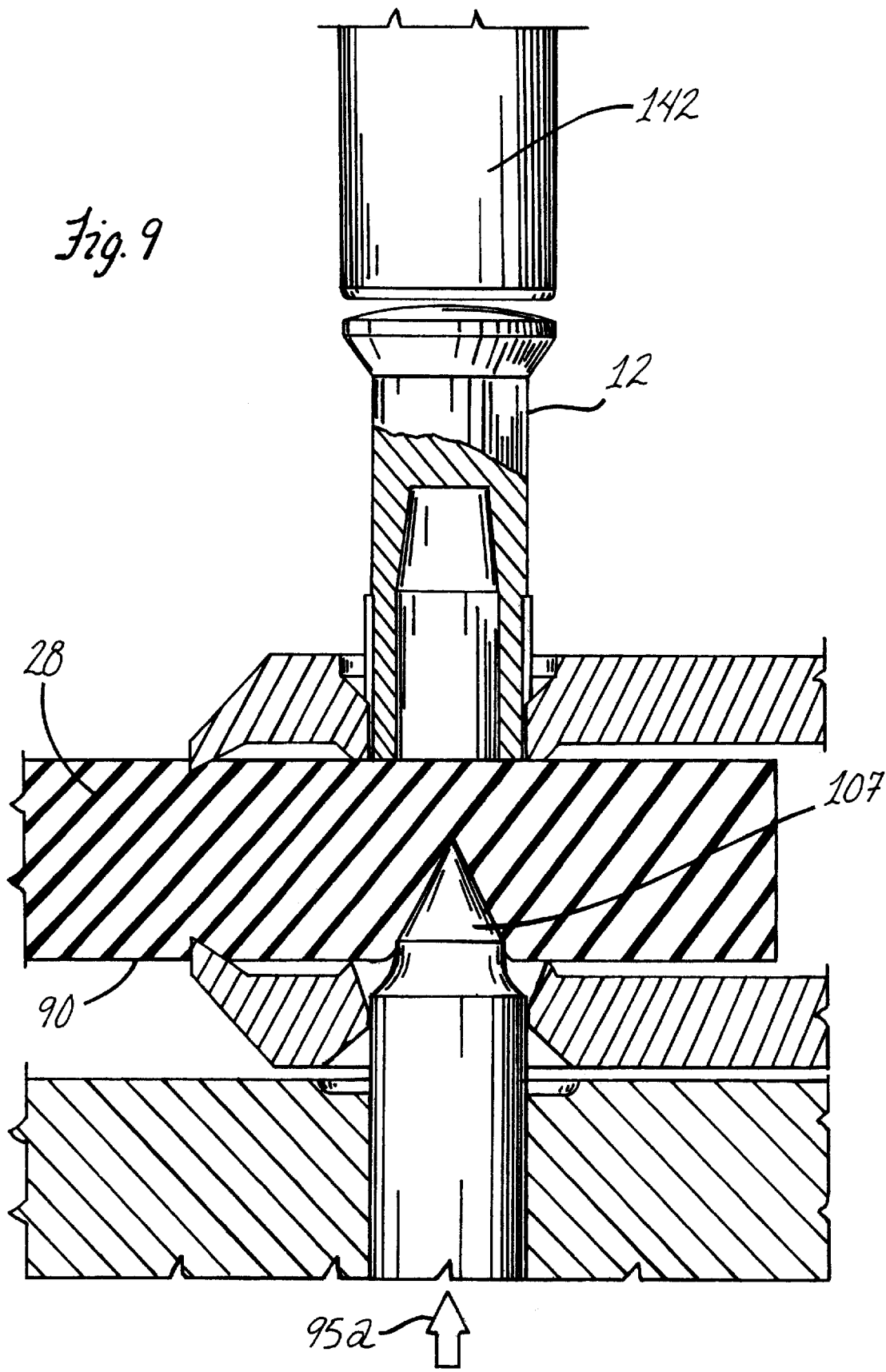
FIG. 9 is a view similar to FIG. 8 showing the nail being advanced into the belt carcass vis-a-vis lower surface thereof.

Turning next to FIGS. 5–14, the applicator machine tool 32 will be described. The applicator machine tool 32 allows for automated installation of the afore-described rivet fasteners 10 so that OEMs can make large volumes of splices in a fast and convenient manner. The machine 32 includes a plurality of operating members 86 provided with highly coordinated movement for staking the rivets 12 so that the upper and lower fastener plates 14 and 16 are clamped and secured to corresponding upper and lower belt surfaces 88 and 90. For shifting of the operating members 86, the machine tool 32 is provided with a camming mechanism, generally designated 92, and an actuator 94. Operation of the actuator 94 causes the operating members 92 to shift in a direction transverse to the belt surfaces 88 and 90 as indicated by double-headed arrow 95 (FIG. 7) in a highly coordinated and programmed sequence or progression of movements that first drive the pilot 40 through the belt 28 in transverse direction 95a, and then the rivets 12 in conjunction with the pilots 40 back through the belt 48 in opposite transverse direction 95b, as best seen in FIGS. 8–10.

To this end, the rivets 12 and the pilots 40 are driven by respective first and second operating members 96 and 98 disposed on opposite sides of the belt 28 inserted into position in the tool 32 via a positioning member 100 mounted between the operating members 96 and 98 on the same side of the belt 28 as operating member 96. A third operating member 102 is disposed on the same side of the belt 28 as the pilot driving second operating member 98 and includes an anvil surface 104 for flaring of the bottom of the rivet shaft 22 to form the upset head 54, as shown being done in FIG. 11. After the lower upset rivet head 54 is formed, the pilot 40 is released from engagement with the rivet shaft 12. In this fashion, the pilots 40, which are in the form of nails having a shank 105 with a sharp leading point or tip 107 at one end thereof, are a reusable item in the tool 32 and thus are not left as potentially dangerous scrap around the splice installation area as done with the previously-described rivet and pilot assemblies. Because of their reuse, the pilot nails 40 herein are of more robust constitution than prior pilot nails and can have a thicker shank 105 thereof, e.g. approximately 0.1875 inch in diameter. The above-described sequence of operations is shown schematically in FIGS. 13a–c and 14a–c and will be described more fully hereinafter with reference to these figures.

More particularly, the applicator machine tool 32 includes a frame 106 including side portions 108 and 110 with the operating members 86 mounted therebetween. The operating members 86 can take the form of elongate bars or jaws that extend between the frame side portions 108 and 110. Referring to FIG. 6, inner and outer racks 112 and 114 are provided with the outer rack 114 being immediately adjacent the frame portions 108 and 110. End wall portion 109 of the frame 106 interconnects frame side portions 108 and 110 with laterally spaced end portions 111 and 113 provided at the front of the frame 106. Sides 114a and 114b of the outer rack 114 span the distance between the frame rear wall portion 109 and the respective frame front end portions 111 and 113 so that the rack 114 is fixed against movement in the transverse direction 95. Rack 112 is located inwardly of the rack 114 and is mounted to rod members 116 and 118 via bushings (not shown) for sliding thereon. The rods 116 and 118 are fixed at their ends to the frame front wall portions 111 and 113 and the rear wall portion 109. Rack sides 112a and 112b are shorter than the distance between respective shoulder surfaces 115a and 115b of the outer rack 114 and the facing frame front end wall portions 111 and 113 to allow shifting of the inner rack 112 therebetween. A horizontal keying arrangement 119 provided between the racks 112 and 114 permits the inner rack 112 to slide in the transverse direction 95 relative to the fixed outer rack 114, for reasons to be described hereinafter.

Each of the operating jaws 96, 98 and 102 are similarly mounted on the rods 116 and 118 for sliding in the transverse direction 95, whereas the positioning member 100 is fixed against movement by being pinned to the rods 116 and 118 as at 121. The rack members 112 and 114 can move together in a longitudinal or vertical direction 123 perpendicular to the transverse direction 95 as driven by the actuator 94 to cause movement of the operating members 86 along the rods 116 and 118 in the transverse direction 95. For this purpose vertical slots 117a and 117b are formed in front portion 112c interconnecting the sides 112a and 112b of the inner rack 112 and through which the rods 116 and 118 extend. The front of the rods 116 and 118 traverse the slots 117a and 117b as the rack 112 is lifted by the actuator 94.

The camming mechanism 92 is provided between the operating members 86 and the racks 112 and 114. In this regard, each of the operating members 86 include cam followers for riding in tracks formed in the racks 112 and 114. The cam followers can be in the form of reduced end portions of the elongate operating jaws 96, 98 and 102. Thus, first elongate operating jaw 96 includes reduced end portions 120a and 120b that ride in oppositely disposed tracks 122a and 122b formed in either side 114a and 114b of the outer rack 114. The second operating jaw 98 has reduced cam follower end portions 124a and 124b that ride in opposite tracks 126a and 126b formed in either side of the inner rack 112, and the third operating jaw 102 has reduced cam follower end portions 128a and 128b which ride in opposite tracks 130a and 130b formed in either side 112a and 112b of the inner rack 112. The racks 112 and 114 are shifted longitudinally or upwardly along inner guiding surfaces 132 and 134 of the respective frame portions 108 and 110 by the actuator 94. Because the operating members 86 are fixed in the longitudinal direction 123 due to their mounting to the rods 116 and 118, the shifting of the racks 112 and 114 in this direction will cause the members 86 to slide along the rods 116 and 118 as the cam tracks 122, 126 and 130 vary transversely from a vertical orientation, as more fully described herein.

Figure 5:
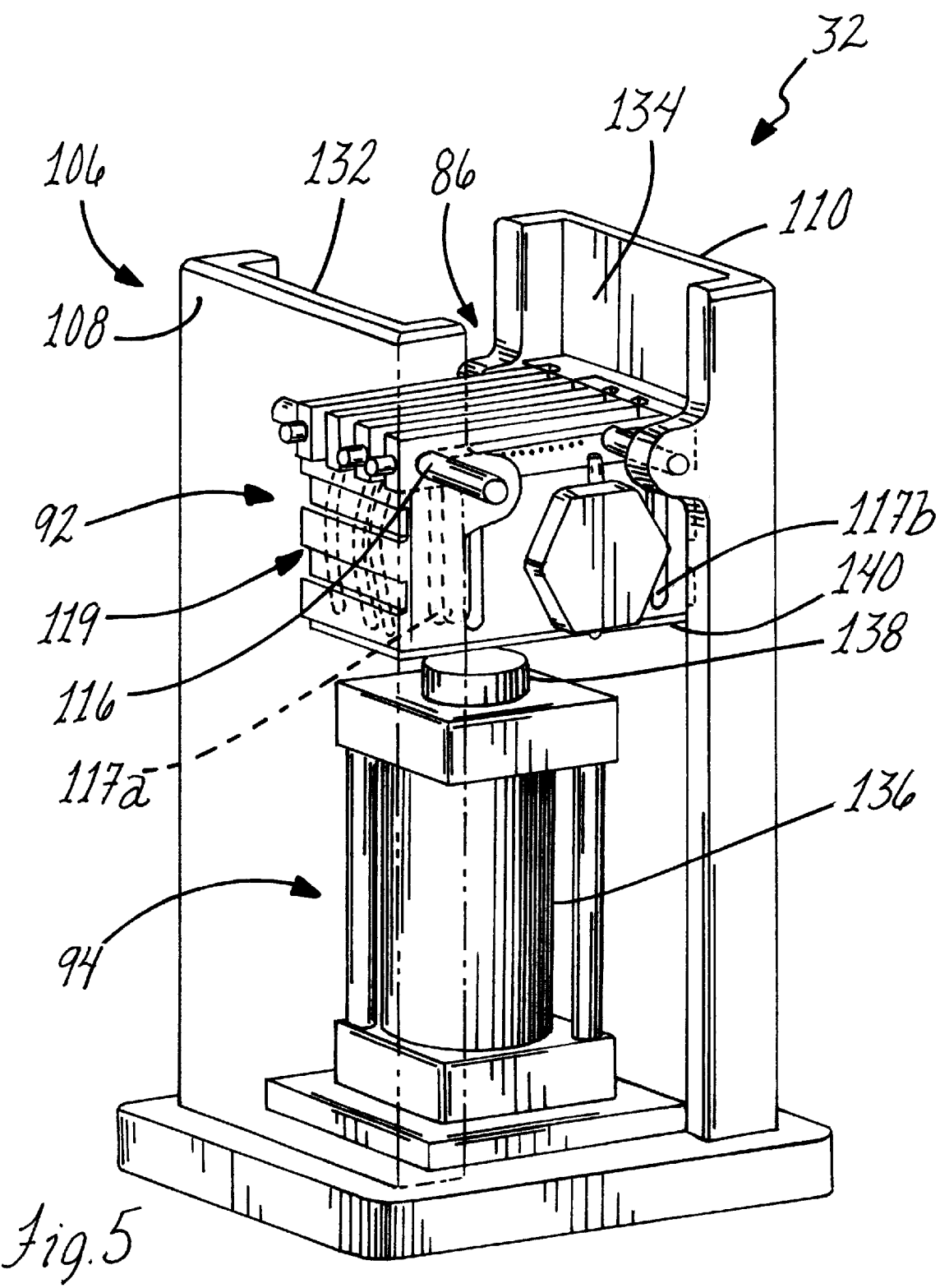
FIG. 5 is a plan view of an applicator machine tool showing a plurality of operating members and a power actuator therefor.

Preferably, the actuator 94 is a hydraulic cylinder 136 including a plunger 138 that is extended in the longitudinal direction 123 and having a predetermined driving stroke to cause the necessary shifting of the operating jaws 96, 98 and 102 for completing an entire rivet staking operation to form a belt splice. Other forms of power actuators can also be utilized such as electrically or pneumatically powered cylinders. As can be seen in FIG. 5, the racks 112 and 114 can be connected to a bottom member 140 which is engaged by the distal end of the plunger 138 to slide the racks 112 and 114 upwardly vis-a-vis slots 117a and 117b and the horizontal key connection 119 therebetween. The predetermined driving stroke can be longer than the distance the operating jaws 86 shift in the transverse direction 95 so as to provide a mechanical advantage vis-a-vis the wedging action provided by the camming mechanism 92 herein. To this end, the plunger 138 can have a rate of movement of 3 inches/second during its driving stroke while the operating members 86 shift at a rate of ½ inch/second. The length of the driving stroke of the plunger 138 in the longitudinal direction 123 can be approximately 8.70 inches. The maximum distance traveled in the transverse direction by the operating members is less than 2 inches, and specifically for the jaw 102 which moves transversely for a greater distance than either jaw 96 or 98 this distance can be approximately 1.75 inches.

As best seen in FIG. 7, the rivet driving first operating jaw 96 mounts a plurality of rivet punches 142 aligned across from the pilots 40 mounted to the pilot driving second operating jaw 98. The third operating jaw 102 is provided with corresponding through openings 144 for the pilots 40 that are centered in the anvil surfaces 104 that can be recessed therein (FIGS. 8–11). The positioning member 100 is similarly provided with through openings 146 for the rivet punches 142 and in which the pre-inserted rivets 12 are disposed. In this manner, the jaw 102 serves to guide the nails 40 as they undergo their transverse movements, and the positioning member 100 serves to guide the rivet punches 142 and rivets 12 as they undergo transverse movement.

In practice, the machine tool 32 is operated for producing belt splices using the pre-inserted rivet fasteners 10 herein by first placing the fasteners 10 in position in the tool via the positioning member 100 so that the hinge loops 72 and 74 of the fasteners 10 are lower than their outboard ends 76 and 78 of the fastener plates 14 and 16 with the upper plate apertures 18 in alignment with the through openings 146 so that the pre-inserted rivets 12 extend therein. Thereafter, the belt end 30 is inserted between the plates 14 and 16 of a strip of the fasteners 10, e.g., fifteen connected fasteners 10 for a seven-inch wide belt end 30. The belt end 30 can abut stops (not shown) of the positioning or comb member 100 used to hold the plates in position projecting between the loops 72 and 74 abutting against the rear of the plates 14 and 16. The cylinder 136 is then fired raising the racks 112 and 114 together.

Figure 13A:
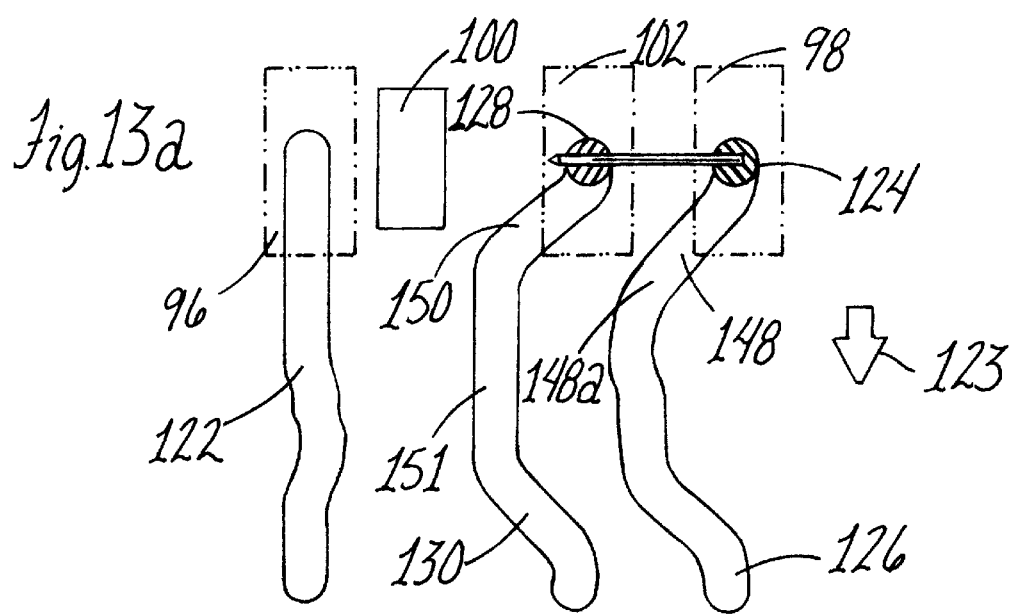
FIGS. 13a–c show cam followers in their respective cam tracks and the progressive movement of operating members to clamp the fastener plates on the belt end portion and drive the pilot nail through the belt to the rivet on the other side thereof.
Figure 13B:
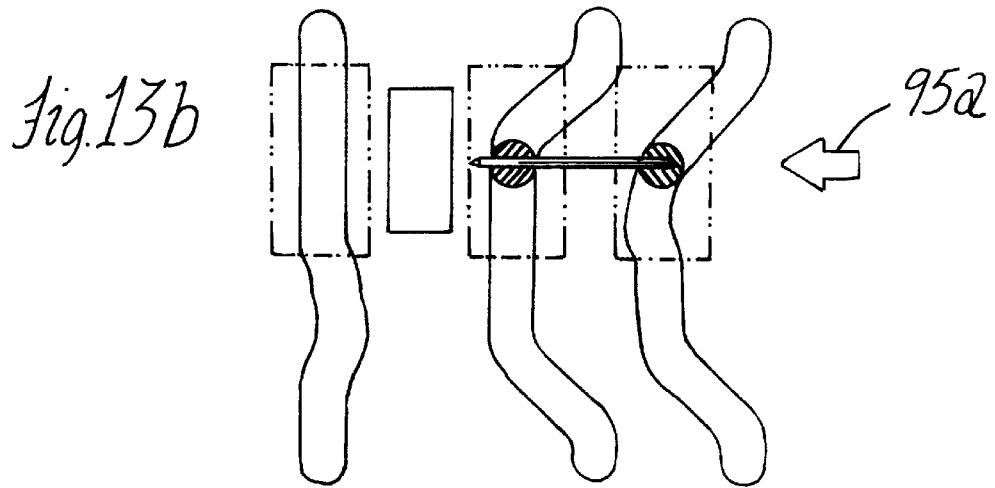

As can be seen in FIGS. 13a and 13b, initially the operating jaws 98 and 102 move together in the transverse direction 95a toward the belt surface 90 so that the jaw 102 engages the lower plate 16 to bring the plates 14 and 16 into substantially parallel orientation with each other clamped on the corresponding upper and lower surfaces 88 and 90 of the belt 28. To do this, the cam tracks 126 and 130 are provided with first transversely angled or offset sections 148 and 150, respectively, which shift the cam followers 124 and 128 and the associated operating jaws 98 and 102 toward the belt surface 90. At the same time, the track 122 of the operating jaw 96 remains vertically oriented so that the jaws 96 does not shift transversely. Aligned with the juncture of the track section 150 with vertically orientated track section 151, the section 148 includes a short portion 148a thereof that continues to jog transversely so that the pilot driving operating jaw 98 continues to move in the transverse direction 95a after the operating jaw 102 has stopped its transverse movement This causes the pilot nails 40 to be advanced through the openings 144 so that their leading tips 107 extend through the apertures 20 of the lower plates 16 and into engagement with the belt lower surface 90, as shown in FIG. 8. Continued travel of cam follower 124 in the portion 148a of the track section 148 causes the tips 107 to pierce the belt carcass as they continue to be advanced in the transverse direction 95a toward the aligned rivets 12 disposed in the through openings 146 of the positioning member 100.

Figure 13C:
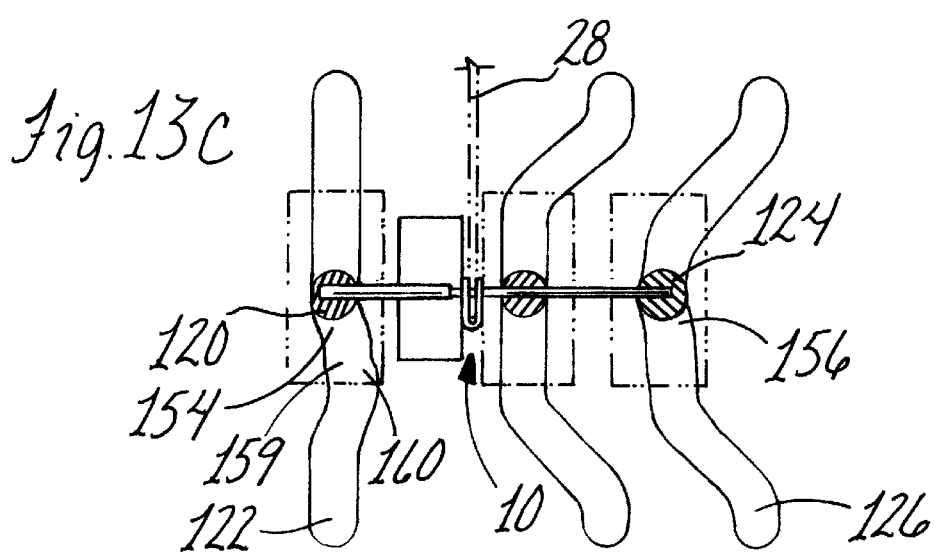

As can be seen in FIG. 9, the pilot nail 40 pierces the belt 28 via the lower surface 90 thereof and acts to spread the belt material or carcass rather than punching a slug of material out therefrom. In this manner, making splices with the present applicator tool 32 does not generate pieces of belt that fall to the ground around the machine 32, as the pilot 40 does little or no damage to the integrity of the belt material. With the cam follower 24 at the end of the belt section 148 as shown in FIG. 13c, the nail leading tip 107 will have pierced through the upper surface 88 of the belt 28 and be in registry in the bore 38 of the tubular wall portion 36 of the rivet shaft 22. At this point, the tracks 122 and 126 have short sections 154 and 156, respectively, that jog in the transverse direction 95b oppositely to that of the track sections 148 and 150 for driving of the rivet 12 and pilot nail 40 back through the belt, as shown in FIG. 10. Thus, with the cam follower 120 riding in the track section 154, the operating jaw 96 will shift toward the belt upper surface 88 advancing the rivet punches 142 into contact with the rivet heads 34 and through the openings 146. This causes the rivets 12 to be driven through the belt 28 via the previously pierced path provided by the pilot nail 40. At the same time the rivet 12 is being driven through the belt 28, the cam follower 124 traverses the track section 156 so as to withdraw or retract the pilot nail 40 in direction 95b and in coordinated fashion with the driving of the rivet 12 so that they move together through the belt 28.

As can be seen in FIG. 10, the diameter of the rivet shaft 22 being driven through the belt 28 is approximately the same as the diameter of the nail shank 105. With the nail tip 107 received in the rivet bore 38, the combination of the rivet 12 and nail 40 together form a unit that generally has a single size diameter for being driven through the belt 28 in direction 95b. The coordination of the movement of the rivets 12 and nails 40 in direction 96b provided by track sections 154 and 156 is important for proper guiding of the rivets 12 through the belt 28 and so that they do not punch out material therefrom. Accordingly, the diameter of the nail shank 105 can be approximately 0.1875 inch which is only slightly larger than the preferred rivet shaft diameter, $D_2$, and slightly less than the diameter, $D_1$, of the raised interference portions 26, previously set forth. Thus, when the rivet 12 together with the pilot nail 40 are advanced through the belt 28 in the path previously formed by the piercing of the belt 28 with the pilot nail 40, belt material will not be punched out by the rivet 12 and instead the material spread about the nail shank 105 will ride up and over the immediately following rivet shaft 22 and tightly wrap and grip thereabout. In this manner, driving of the rivet 12 through the belt 20 minimizes damage to the carcass of the belt 28 so that it retains much of its original integrity and strength and so that the splice formed with the pre-inserted rivet fasteners 10 is also stronger as there is no loose play between a hole formed in the belt and the rivet shaft and instead there is tight gripping of the spread belt material thereagainst.

After the cam follower 124 reaches the end of track section 156, the track 126 returns to a vertical orientation in section 157 thereof so that the nails 40 cease to be withdrawn in the transverse direction 95b. The pilot nails 40 are provided with an arcuate shoulder surface 158 formed in the transition area between the shank 105 and the tip 107. This shoulder surface 158 serves as a curling surface for the bottom of the rivet shaft 22. By way of example and not limitation, the curling surface 158 can have a 0.047 inch radius of curvature for an axial distance of approximately 0.060 inch. The position of the end of the section 156 of the track 126 is determined so that the nails 40 stop being withdrawn in the transverse direction 95b when their curling surfaces 158 come into cooperating alignment with the recessed anvil surface 104 of the fastener third operating jaw 102 belt, as shown in FIG. 11. After traveling vertically for a short distance in track section 159 after track section 154, the cam follower 120 enters track section 160 which is angled transversely to cause the follower 120 and associated rivet driving jaw 96 to again shift toward the belt surface 88 in direction 95b. In this manner, the operating jaw 96 continues to drive the rivet 12 in the transverse direction 95b while the pilot nail 40 remains fixed due to the vertical orientation of section 151 of the track 126 for the operating jaw 98. As the rivet 12 is driven toward the similarly fixed operating jaw 102 including anvil surface 104, the tubular wall portion 36 of the rivet shaft 22 will slide over the tip 107 so that the end of the rivet shaft 22 begins to curl on the arcuate shoulder surface 158 of the pilot nail 40 and into the adjacent, aligned anvil surface 104, as shown in FIG. 11. This continues until the upper head 34 is seated flush in the upper plate aperture 18 as previously described with the upset rivet head 54 being properly formed for filling lower plate aperture 20.

As can be seen by reference to FIGS. 13b and 13c and FIGS. 14a and 14b, during the entire process of piercing the belt 28 with the pilot nail 40, driving the rivet 12 and pilot nail 40 together back through the belt, and forming the upset rivet head 54, the follower 128 of the third operating jaw 102 rides in the vertical section 151 of the track 130 so that the jaw 102 in cooperation with the positioning member 100 maintains the clamping pressure on the fastener plates 14 and 16 against the belt surfaces 88 and 90, respectively, during these operations. After the upset rivet head 54 is formed, the cam tracks 122, 126 and 130 return into alignment with their respective original positions with respect to transverse direction 95 with the rivet punches 142 being withdrawn in direction 95a by the operating jaw 96, the pilot nails 40 being withdrawn by the operating jaw 98 in the opposite transverse direction 95b, and the third operating jaw 102 withdrawing from its clamped position in direction 95b, as shown in FIG. 14c. As is apparent, the tool 32 utilizes a single driving stroke from the plunger 138 of hydraulic cylinder 136 to obtain the movements of the jaws 96, 98 and 102 needed to complete all the operations to secure the strip of pre-inserted rivet fasteners 10 to the belt end portion 30.

The applicator machine tool 32 also allows for adjustments to be made to accommodate the different thicknesses of conveyor belts 28 that can be used with the fasteners 10. For instance, the illustrated fasteners 10 are sized to be used with belts 28 having thicknesses in the range of 1/8" to 7/32". An adjustment member in the form of screw 162 provided with a threaded shank 164 is attached at its distal end to the front wall portion 112a of the inner rack 112. The screw shank 164 is threaded through fixed member 166 attached at the front of the frame 106 so that turning knob head 168 of the screw 162 will either advance or retract the rack 112 in the transverse direction 95 relative to the rack 114. This relative movement between the racks 112 and 114 is allowed by the previously-described horizontal key connection 119 therebetween and the slidable mounting of the rack 112 to the rods 116 and 118. Thus, turning the adjustment screw 162 in a tightening direction causes the rack 112 to shift to bring both of the operating jaws 98 and 102 together closer to the fixed jaw 100. This adjustment allows the applicator tool 32 to attach the fasteners 10 to thinner belts 28. Turning the knob 168 in the opposite direction shifts the rack 112 and operating jaws 98 and 102 away from the positioning jaw 100 to allow the tool 32 to attach the fasteners 10 to thicker belts 28.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for installing fasteners having a pair of plates with apertures therein on ends of conveyor belts, the apparatus comprising a frame;

a plurality of operating members mounted to the frame;

a positioning member between the operating members for placing the fasteners and belt in predetermined positions relative to each other with the belt end projecting between the fastener plates;

a camming mechanism for shifting the operating members in a transverse direction relative to the belt;

rivets of the fasteners driven by a first one of the operating members on one side of the belt for riveting the fastener to the belt end;

pilot nails aligned with the rivets driven by a second one of the operating members on an opposite side of the belt to pierce the belt; and an actuator cooperating with the camming mechanism to coordinate the shifting of the operating members for driving of the rivets and nails so that the nails are first driven through the belt to the aligned rivets and the rivets together with the nails are then driven back through the belt with the rivets being led by the pilot nails therethrough.

2. The apparatus of claim 1 wherein the rivets include a tubular end portion pre-inserted to the aperture of one of the plates of the fasteners, and the nails are driven through the aperture of the other plate and the belt into registry with the rivet tubular end portions.

3. The apparatus of claim 1 wherein the actuator is a power actuator that has a predetermined driving stroke in a longitudinal direction that is larger than the distance the actuator causes the operating members to shift to provide a mechanical advantage in driving of the rivets and nails.

4. The apparatus of claim 1 wherein the camming mechanism includes cam followers of the operating members that are substantially fixed against shifting in the longitudinal direction, and cam tracks in which the followers are disposed for shifting the operating members in the transverse direction as the tracks are shifted in the longitudinal direction by the actuator.

5. The apparatus of claim 4 wherein the camming mechanism includes a rack having the cam tracks and the actuator is a single power cylinder which shifts the rack and cam tracks in the longitudinal direction to shift the operating members in the transverse direction by a single driving stroke of the cylinder.

6. The apparatus of claim 1 wherein a third one of the operating members includes an anvil surface and the pilot nail includes a rivet curling surface, and the camming mechanism is operable to shift the second operating member to bring the rivet curling surface into cooperation with the anvil surface with the second operating member then pausing while the first operating member continues to shift to push the rivet against the curling surface and to the anvil surface for forming an upset head on the rivet.

7. The apparatus of claim 6 wherein the third operating member is a clamping and anvil member shifted by the camming mechanism to clamp the fastener plates on surfaces of the belt at the end thereof, and an adjustment member is operable to shift the second and third operating members together relative to the frame to allow for different thicknesses of belts to be riveted.

8. A method of securing a belt fastener having a pre-inserted rivet thereon to a belt end, the method comprising:

placing a belt end including upper and lower surfaces between upper and lower plates of a plurality of fasteners with the pre-inserted rivets on one of the lower and upper plates;

causing pilots to be driven through apertures of the other of the upper and lower plates and through the adjacent belt surface and then into hollow bores in tubular rivet ends of the pre-inserted rivets;

driving the pre-inserted rivets through the apertures of the one plates with the hollow rivets following the previous path of the pilots; and forming the tubular ends of the rivets into flared-shaped rivet heads at the other plates to secure the belt fasteners to the belt end.

9. The method of claim 8 wherein the pilots are nails including sharp leading points thereof, and spreading material of the belt by driving of the pilot nails therethrough from the belt lower surface to the belt upper surface and into the rivet bores to minimize belt material punched out by the rivets as they are driven and led back through the belt by the pilot nails.

10. The method of claim 8 wherein the pilots are first driven through the belt from the lower to upper surface thereof and the rivets and pilots are next driven together oppositely to the initial driving direction of the pilots for piercing the belt, stopping the pilots at predetermined positions; and flaring portions of the tubular rivet ends with a portion of the stopped pilots when forming the rivet heads located at the lower plates of the belt fasteners.

11. The method of claim 10 including providing an actuator having a driving stroke, and the pilots are driven in their initial driving direction, the rivets and pilots are next driven together opposite to the pilots initial driving direction, the pilots are stopped, and portions of the tubular rivet ends are flared all by a single driving stroke of the actuator.

* * * * *